E. C. WRIGHT.
DYNAMO ELECTRIC MACHINE.
APPLICATION FILED JAN. 22, 1906.
911,797.
Patented Feb. 9, 1909.
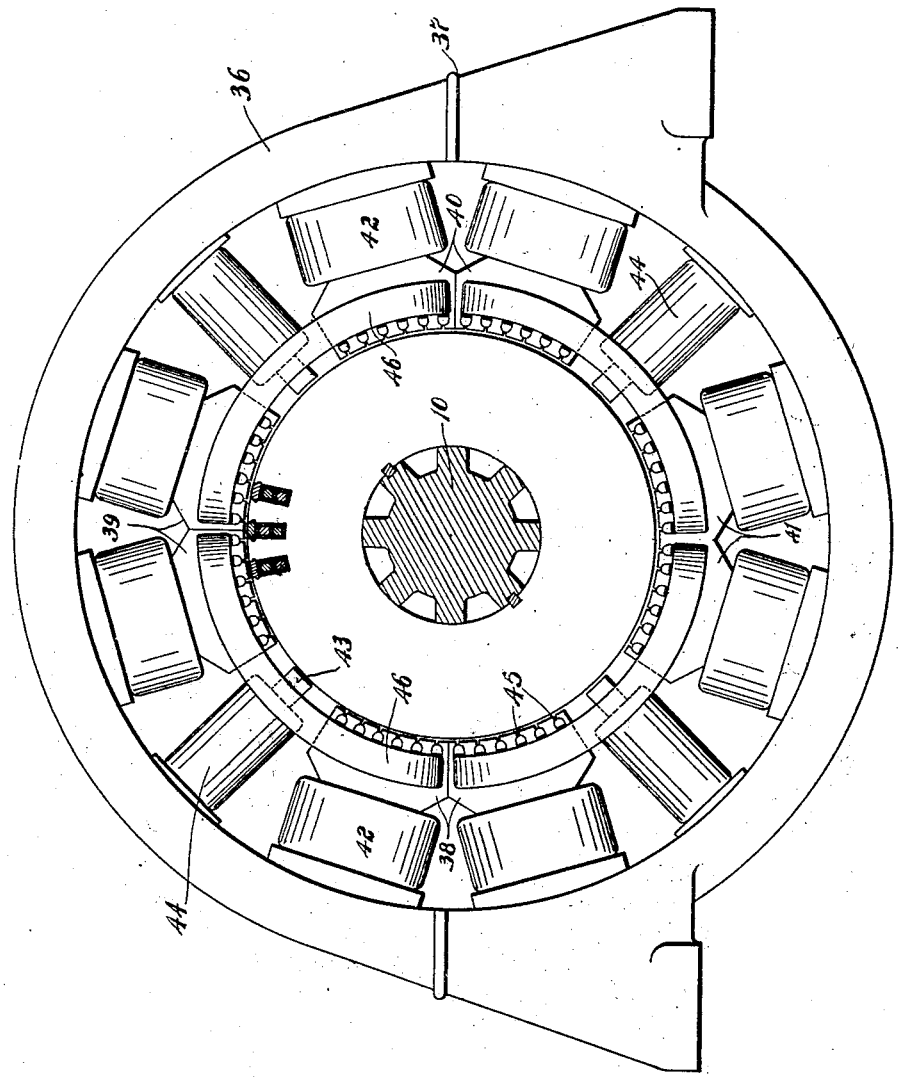
WITNESSES:
George J. Schwartz
Fred J. Kinsey
INVENTOR:
Edwin C. Wright.
BY
Chas. E. Lord
ATTORNEY

UNITED STATES PATENT OFFICE.

EDWIN C. WRIGHT, OF NEWPORT, KENTUCKY, ASSIGNOR TO THE BULLOCK ELECTRIC MANUFACTURING COMPANY, A CORPORATION OF OHIO.

DYNAMO-ELECTRIC MACHINE.

No. 911,797.　　　Specification of Letters Patent.　　　Patented Feb. 9, 1909.

Application filed January 22, 1906. Serial No. 297,136.

*To all whom it may concern:*

Be it known that I, EDWIN C. WRIGHT, citizen of the United States, residing at Newport, in the county of Campbell and State of Kentucky, have invented certain new and useful Improvements in Dynamo-Electric Machines, of which the following is a full, clear, and exact specification.

My invention relates to dynamo-electric machines and particularly to generators designed for high speeds and large out-puts.

In large dynamo-electric machines, it is necessary, for convenience in assembling, testing, shipping, etc. that the upper half of the field frame be removable from the lower half. Furthermore, it is customary to provide field members with auxiliary field windings to prevent sparking at the brushes. These auxiliary field windings may be arranged on poles intermediate the main field poles, or may be distributed in slots in the inner faces of the pole shoes or both arrangements may be employed in the same machine. When it is desired to balance the armature reaction, and in alternating current machines to neutralize the armature self-induction, the windings are distributed in the faces of the pole shoes. This distributed winding usually consists of coils arranged in groups which extend between each adjacent pair of poles. When the field member of the dynamo-electric machine is thus provided with a distributed balancing winding arranged in this manner, it is impossible to remove the upper half of the field element from the lower half without first removing a portion of the coils of the balancing winding.

The object of my invention is to so construct and arrange the field poles and the field coils including the coils of the main and auxiliary windings that part or parts of the field frame can be removed completely without first removing or disturbing either the main field coils or the coils of the balancing winding. This I accomplish by providing pole pieces, each of which is composed of two separable parts, the lines of division of the parts of which poles are between the groups of the balancing coils.

Other objects and novel features of my invention will appear from the detailed description.

My invention therefore consists in certain novel details of construction, and combinations and arrangements of elements described in the specification and set forth in the appended claims.

The single figure of the accompanying drawing is a partly sectional end elevation of a dynamo-electric machine embodying my invention.

The shaft 10 carries the rotating armature structure, which may be of any desired type. The field frame 36 is divided along the line 37 in the usual manner. Extending inwardly from the field frame are the main poles or cores 38, 39, 40 and 41. Although I have shown a fourpole machine, I am not to be limited to this form as any other number of poles may as well be employed. Each of the poles consists of two parts, each part having a separate main field coil 42. The parts of each pole are provided with enlarged inner portions which are in engagement with each other, thus practically forming a single pole shoe with a continuous pole face. Intermediate the main field poles are auxiliary field poles 43, provided with auxiliary field coils 44. The object of these coils, which are known as commutating coils, is to produce commutating fields for the armature coils which are short-circuited by the brushes. As shown in the drawing, the pole shoes are provided with slots 45. Arranged in these slots are the coils 46 of a distributed auxiliary field winding, called a balancing winding. The object of the auxiliary distributed winding is, as is well known, to neutralize the armature reaction and to prevent distortion of the field. The coils of this distributed winding are arranged in groups, and the coils of each group are concentric and are arranged in the slots of the two adjacent halves of two adjacent poles, the groups being separated by the dividing lines of the halves of the poles.

It is seen from the drawing that the line of division between the parts of each pole is between the groups of coils and the lines of division between the parts of the poles 38 and 40 are substantially in line with the lines of division 37 of the field frame. With this arrangement, the upper part of the field element can be removed from the lower part without first removing either the main field coils or the auxiliary field coils.

I aim in my claims to cover all modifications which do not involve a departure from the spirit and scope of my invention.

What I claim as new and desire to secure by Letters Patent is:—

1. In a dynamo-electric machine, a field frame, field poles each consisting of two separable parts having slotted inner end portions in engagement with each other, a separate field coil on each part, and a distributed auxiliary winding separate from the field coils and having its coils arranged in groups and located in the slots of said poles, the groups being separated by the lines of division between the parts of the poles.

2. In a dynamo-electric machine, a field frame, field poles each consisting of two separable parts, each part of each pole having a slotted pole shoe portion, and coils of an auxiliary field winding in the slots of said portions, said coils being arranged in groups, the coils in the slots of the two parts of each pole being in different groups.

3. In a dynamo-electric machine, a field frame, field poles each consisting of two separable parts having slotted pole shoe portions in engagement with each other, and distributed field coils arranged in groups and located in the slots of said portions, each group consisting of a number of concentric coils arranged in the slots of two adjacent parts of adjacent poles.

4. In a dynamo-electric machine, a field frame, main field poles, field coils thereon, the inner faces of the field poles being slotted, a distributed winding, the coils of which are arranged in groups in the slots of the pole faces, the field frame, poles, main field coils and balancing coils being so arranged and divided that one half the frame and one half of all the coils may be lifted from the other half.

5. In a dynamo-electric machine, a field frame, field poles having slotted pole shoes, each pole consisting of two parts, a field coil on each part, and a group of balancing coils having its conductors in the slots of adjacent parts of adjacent poles.

6. In a dynamo-electric machine, a field frame divided into two portions, field poles each composed of two separable parts, distributed balancing coils arranged in groups, the line of division between the parts of each of two opposite poles occurring substantially along the lines of division of the field frame and of the groups of the balancing coils.

7. In a dynamo-electric machine, a field frame divided into two portions, and field poles arranged opposite the dividing lines in the field frame, each of said poles consisting of two parts, the inner faces of which are in contact with each other substantially along the dividing lines in the field frame, main field coils and distributed auxiliary field coils or balancing coils on the inner ends of the poles, the coils being so arranged that the upper half of the field frame and poles may be removed from the lower half without first removing any of the field coils.

8. In a dynamo-electric machine, a field frame, field poles each divided into two portions, a separate field coil on each half of each pole, a distributed auxiliary field winding, the coils being arranged in groups, which extend in opposite direction from the dividing lines in the poles, whereby one half of the field element can be separated from the other half along the center lines of two opposite poles without first removing the main field coils or balancing coils.

9. In a dynamo-electric machine, a field frame, main field poles, coils thereon, auxiliary field poles intermediate the main field poles, an auxiliary field winding thereon for producing commutating fields, a second auxiliary field winding distributed in slots in the pole faces, for balancing the armature reaction, said poles being so constructed and the windings being so arranged that the upper half of the field frame and one half of the main field coils and auxiliary field coils may be lifted from the other half.

In testimony whereof I affix my signature, in the presence of two witnesses.

EDWIN C. WRIGHT.

Witnesses:
ARTHUR F. KWIS,
FRED J. KINSEY.